June 1, 1943.  T. C. PEW  2,320,794
SEAL FOR ANTIFRICTION BEARINGS
Filed Jan. 19, 1942  2 Sheets-Sheet 1

INVENTOR.
Thomas C. Pew
BY Barnes, Kisselle, Laughlin & Raisch
Attorneys

June 1, 1943.　　　　T. C. PEW　　　　2,320,794
SEAL FOR ANTIFRICTION BEARINGS
Filed Jan. 19, 1942　　　　2 Sheets-Sheet 2
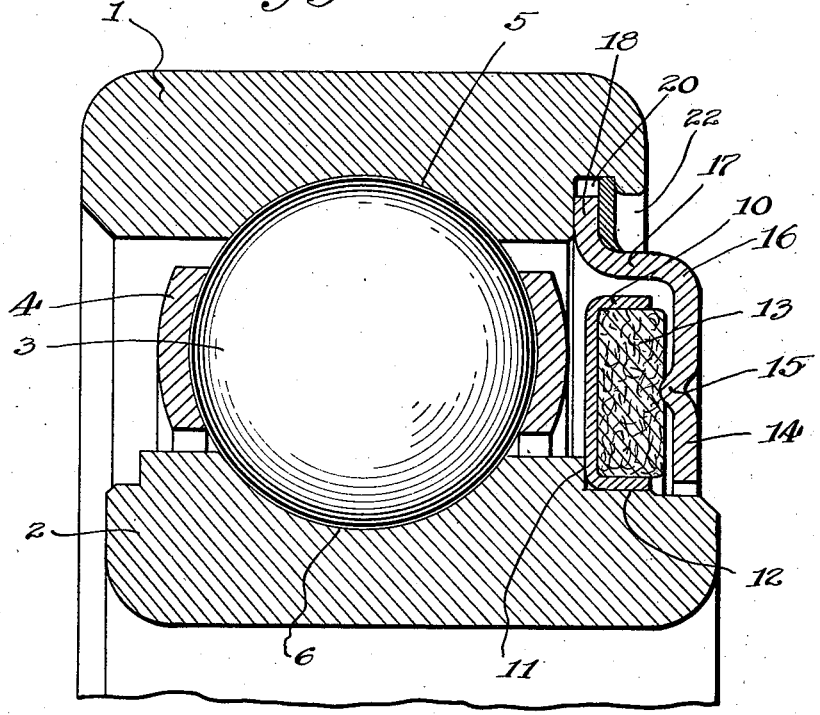
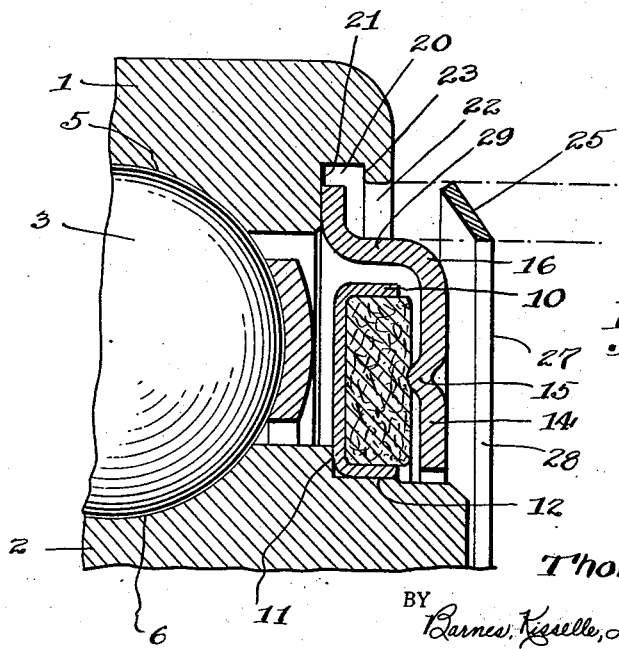
INVENTOR.
Thomas C. Pew
BY Barnes, Kisselle, Laughlin & Raisch
Attorneys.

UNITED STATES PATENT OFFICE 2,320,794

SEAL FOR ANTIFRICTION BEARINGS

Thomas C. Pew, Ann Arbor, Mich., assignor to Hoover Ball & Bearing Company, Ann Arbor, Mich., a corporation of Michigan Application January 19, 1942, Serial No. 427,348

2 Claims. (Cl. 286—5)

This invention relates to antifriction bearings which, as is generally known to those versed in the art, usually comprises inner and outer races with rolling elements therebetween.

The requirements for accuracy and precision in antifriction bearings are high and have progressively become more exacting. The general object of the invention is to provide an improved sealing structure between the inner and outer races which will practically eliminate or, in any event, minimize the tendency to throw the outer race into an out of round condition in the assembling of the sealing structure.

It has been the practice to machine the bearing race members, such as the outer race member, and to then harden the same. The hardening or heat treating action can be expected to normally cause a slight out of round condition of the race member, but this is corrected, insofar as the race surface after the hardening process. However, the surfaces which are not ground, including an undercut formation or groove for the reception of a sealing ring or disc, remain out of round. Now, when a sealing disc or ring is pressed into the machined groove, the forces on the race are not equal throughout the circumference of the groove due to the out of round condition of the groove, and this causes a flexing or springing of the race member as a whole, thus throwing the race surface again out of round.

In accordance with this invention a sealing structure is provided which can be located and mounted in a machined groove of a bearing race under pressure, which machined groove may be out of round, without throwing the finish ground race surface out of round or, in any event, minimizing the number of races rendered objectionable from this standpoint. The invention will be better understood by reference to the accompanying drawings and detailed description.

Fig. 2 is an enlarged cross sectional view taken on line 2—2 of Fig. 1.

Fig. 3 is a view similar to Fig. 2 illustrating the structure prior to final assembly.

Figure 5:
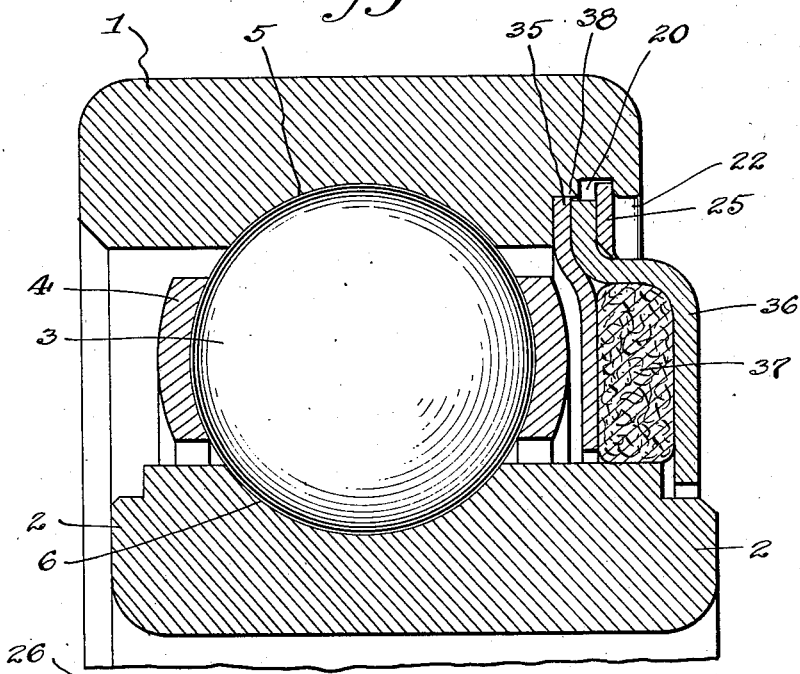
Fig. 5 is a view illustrating a modified form of seal structure.

For the purposes of disclosing the invention, an antifriction bearing is illustrated having an outer race member 1 and an inner race member 2, between which are disposed balls 3 which may be held in a suitable cage or retainer 4. As shown in Figs. 2 and 5, the outer and inner races have grooved race-way surfaces for the balls illustrated at 5 and 6.

The seal structure, so far as the contacting sealing elements are concerned, is subject to variation, but the one shown in Fig. 2 includes a channelled element 10 positioned against a shoulder 11 of the inner race and over the surface 12. This channelled member carries a suitable packing such as a piece of felt or the like 13. A covering disc 14 contacts with the packing as at 15 and it is fashioned so as to have a bend line 16, an off-set portion 17 extending generally in an axial direction, and an outer peripheral edge portion 18. The portion 17 may be visualized as being tubular. It will be understood that the channel 10 and the packing 13 rotate with the inner race while the member 16 rotates with the outer race.

The outer race is provided with a circumferential groove 20, against the back wall 21 of which the portion 18 of the disc 14 abuts. The outer wall of the groove 20 as at 22 is on a radius greater than the innermost radius of the outer race and the inner surface 23 defines the groove. The radius at 22 is such as to permit the sealing member 14 to pass through the same so that it can be abutted against the surface 21.

Figures 1, 4:
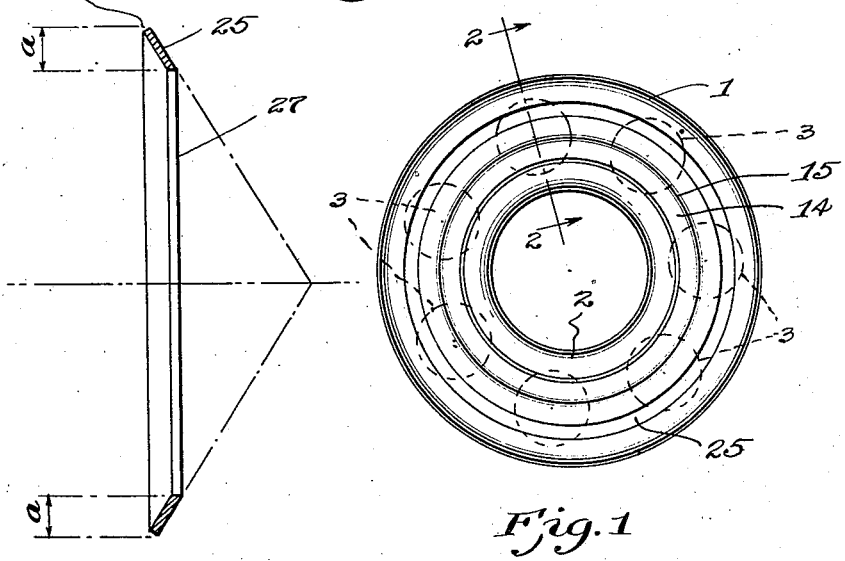
Fig. 1 is a side elevational view illustrating an antifriction bearing employing balls as the rolling elements.
Fig. 4 is a cross sectional view of the holding ring.

The holding washer is generally illustrated at 25 in Fig. 4 and it is of frusto-conical shape as indicated. The outer edge as at 26 may be at right angles to the sides of the washer while the inner edge 28 is preferably angularly disposed, and it may extend substantially in an axial direction, thus presenting a relatively sharp edge 27 (Figs. 3 and 4). As shown in Fig. 3, the outside diameter of the washer is such that it may be passed through the opening defined by the wall surface 22. The cross dimension $a$ (Fig. 4) of the washer measured in a true radial direction is such as to substantially approximate the distance between the surface 22 and the outer surface 29 of the off-set portion 17.

In making the assembly the holding washer is placed in position with its outer region contacting the outer portion 18 of the disc 14 as will be visualized by consideration of Fig. 3. The holding washer is now subjected to axial pressure and the inner region is pushed inwardly along an outer surface 29. The holding washer is of a substantially dead soft nature, such as soft steel, so that when it is distorted it remains in distorted condition. As shown in Fig. 2, the washer has been distorted until it lies substantially in a radial plane. The surface 28 may slide along the surface 29 and this causes an expansion of the metal and flowing of the metal of the ring until its outer portion engages behind the surface 23.

When the holding ring is finally positioned it retains its shape and, moreover, tightly engages between the surface 23, the surface 29 of the washer 14 and a part of the portion 18. As illustrated in Fig. 2 the washer has been distorted until it lies flush against the peripheral portion 18. However, in the making of the bearings under production methods the holding ring may not always be completely made flush against the portion 18. The holding washer, nevertheless, is tightly engaged between the surface 23, the portion 18 and the surface 29.

The feathered or beveled edge 27 of the washer provides for a sort of adjustment as between the washer and the surface 29 of the sealing ring 14 to accommodate variation and tolerances in the dimensions of the parts and to also accommodate for out of round conditions of the groove 20. The groove 20 may be slightly out of round because it is only a machined groove, and this out of round condition is set up in the hardening of the race. The raceway 5, of course, is finish ground after the hardening process and therefore presents a true surface. As the washer is collapsed under pressure and pushed home, that is from the Fig. 3 position to the Fig. 2 position, its outer edge 26 may abut and seat in the bottom of the groove 20. But the radial outward forces delivered to the race 1 are minimized because the feathered edge 27 becomes distorted or flared outwardly as clearly shown in Fig. 2. Moreover, this sharp feathered edge, although the washer is of soft metal, may dig into or bite into the axial portion 17 of the sealing washer. Thus the washer is not forced bodily outwardly and the outward forces on the race 1 are minimized. The washer becomes tightly engaged at three points, namely, against the surface 23 of the groove, the surface or part of the surface of the portion 18 of the sealing washer, and at the location of the engagement between the feathered edge and the surface 29. Sometimes also the washer may seat against the bottom of the groove. In Fig. 2 the washer is shown as seated, while in Fig. 5 there is a slight clearance between the outer edge of the washer and the bottom of the groove, as this variation will exist in production methods.

In Fig. 5 a structure is shown which indicates how different types of seals can be used with this invention. The same reference characters are applied to parts which are identical to the structures heretofore described. In this form the seal includes an inner disc 35 and an outer disc 36 between which a suitable packing or felt 37 is placed. The groove structure 20 and the washer 25 is the same as that heretofore described, except that the groove structure may have an additional off-set or shoulder 38 for the reception of the disc 35. In this form the two sealing discs and the packing rotate with the outer race with the packing wiping the inner race, as distinguished from Fig. 2 where the packing rotates with the inner race and the frictional engagement is between the packing and the disc secured to the outer race. The description and drawings show the seal structure applied to only one side of a bearing, but it is obvious that this seal can be applied to both sides of a bearing.

I claim:

1. The combination with an outer ring member and an inner ring member of a bearing, said members being relatively rotatable and having a space therebetween for accommodating rolling elements, of a plate member carried by the outer ring member and projecting toward the inner ring member and having an outer portion disposed substantially in a radial plane, an inner portion disposed substantially in a radial plane and an intermediate portion extending axially and connecting the inner and outer portions whereby the inner and outer portions are axially offset, the outer member having a circumferential inwardly opening groove adjacent one side thereof, the inner side wall of the groove being in a substantially radial plane and terminating on a radius less than the radius of the outer side wall of the groove, the plate member having an outside diameter such as to pass through the outer wall of the groove and the outer radial portion of the plate member being abutted against the inner radial side wall of the groove, a normally frusto-conical washer of soft metal having an outside diameter such as to pass through the outer wall of the groove and having an inside diameter substantially comparable to the outside diameter of the intermediate portion of the plate member, said washer being deformed into flattened and expanded form so as to lie substantially flush against the outer radial portion of said plate member with its outer peripheral edge lying within the groove and engaging behind the outer side wall of the groove and in such expanded form having an outside diameter less than the diameter of the bottom of the groove whereby the plate member and washer are tightly engaged between the inner and outer side walls of the groove without pressure engagement of the peripheral edge of the washer with the bottom of the groove, said washer having its inner peripheral edge in biting engagement with the intermediate axial portion of the plate.

2. The combination with an outer ring member and an inner ring member of a bearing, said members being relatively rotatable and having a space therebetween for accommodating rolling elements, of a plate member carried by the outer ring member and projecting toward the inner ring member and having an outer portion disposed substantially in a radial plane, an inner portion and an intermediate portion extending in an axial direction and connecting the inner and outer portions whereby the inner and outer portions are axially offset, the outer member having a circumferential inwardly opening groove adjacent one side thereof, the inner side wall of the groove being in a substantially radial plane and terminating on a radius less than the radius of the outer side wall of the groove, the outer radial portion of the plate member being abutted against the inner radial side wall of the groove, a normally frusto-conical metal washer, said washer being deformed into flattened and expanded form so as to lie substantially flush against the outer radial portion of said plate member with its outer peripheral edge lying within the groove and engaging behind the outer side wall of the groove and in such expanded form having an outside diameter less than the diameter of the bottom of the groove whereby the plate member and washer are tightly engaged between the inner and outer side walls of the groove without pressure engagement of the peripheral edge of the washer with the bottom of the groove, said washer having its inner peripheral edge in engagement with the intermediate axial portion of the plate.

THOMAS C. PEW.